(12) United States Patent
Murata et al.

(10) Patent No.: US 6,367,577 B2
(45) Date of Patent: Apr. 9, 2002

(54) VEHICLE INCLUDING A VARIABLE GEAR RATIO STEERING DEVICE AND AN ELECTRIC POWER STEERING APPARATUS

(75) Inventors: Makoto Murata; Takao Kurosawa; Kouji Sasajima, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/800,184

(22) Filed: Mar. 6, 2001

(30) Foreign Application Priority Data

Apr. 5, 2000 (JP) .......................................... 2000-103291

(51) Int. Cl.[7] ................................................ B62D 5/04
(52) U.S. Cl. ............................ 180/446; 74/393; 74/399
(58) Field of Search ................................... 180/446, 443, 180/444; 701/41; 280/93.514, 93.515; 74/393, 399, 398, 397

(56) References Cited

U.S. PATENT DOCUMENTS

| | | | | |
|---|---|---|---|---|
| 4,658,927 A | * | 4/1987 | Kanazawa | 180/142 |
| 5,174,407 A | * | 12/1992 | Shimizu et al. | 180/79.1 |
| 5,203,421 A | * | 4/1993 | Ueno et al. | 180/132 |
| 5,284,219 A | * | 2/1994 | Shimizu et al. | 180/79.1 |
| 5,386,879 A | * | 2/1995 | Shimizu | 180/79 |
| 5,423,391 A | * | 6/1995 | Shimizu | 180/79.1 |
| 5,489,004 A | * | 2/1996 | Shimizu et al. | 180/79 |
| 5,503,239 A | | 4/1996 | Shimizu | |
| 6,155,377 A | * | 12/2000 | Tokunaga et al. | 180/446 |

FOREIGN PATENT DOCUMENTS

| | | |
|---|---|---|
| JP | 62-181958 A | 8/1987 |
| JP | 08-127355 | 5/1996 |
| JP | 2000-198457 | 7/2000 |

* cited by examiner

*Primary Examiner*—Avraham H. Lerner
(74) *Attorney, Agent, or Firm*—Merchant & Gould P.C.

(57) ABSTRACT

A vehicle including a variable gear ratio steering device and an electric power steering apparatus is disclosed. The variable gear ratio steering device influences on a steering system of the vehicle and varies a ratio of a steering angle of steerable road wheels to a steering wheel angle by driving an electric motor in accordance with a vehicle speed. The electric power steering apparatus influences on the steering system of the vehicle and provides an assist steering wheel torque by driving an electric motor in accordance with a manual steering wheel torque. The vehicle comprises a power supply voltage detector for detecting a voltage of a power supply, and a control unit for controlling the electric motor of said variable gear ratio steering device in accordance with the detected voltage. When the detected voltage decreases to a certain voltage or lower, the control unit brings the variable gear ratio steering device into a slow state and thereafter stops the same.

7 Claims, 12 Drawing Sheets

A: ROTATIONAL CENTER OF INPUT SHAFT 11
B: ROTATIONAL CENTER OF OUTPUT SHAFT 17
C: POINT OF ENGAGEMENT OF INTERMEDIATE SHAFT 19
a: DISTANCE BETWEEN A AND B
b: DISTANCE BETWEEN B AND C (UNDER VOLTAGE STATE)

(VOLTAGE RECOVERY STATE)

VEHICLE INCLUDING A VARIABLE GEAR RATIO STEERING DEVICE AND AN ELECTRIC POWER STEERING APPARATUS

FIELD OF THE INVENTION

The present invention relates to vehicles including a variable gear ratio steering device and an electric power steering apparatus.

BACKGROUND OF THE INVENTION

Vehicles including a variable gear ratio steering device and an electric power steering apparatus have been widely known. The variable gear ratio steering device influences on a steering system of the vehicle and continuously varies the steering angle ratio (also referred to as "transmission rate" or "reduction gear ratio") or the ratio of the steering angle of the road wheels to the steering wheel angle. The variable gear ratio steering device sets the steering angle ratio to a greater value in a low speed range, at which a steering operation with a large steering input is often necessary, so that the turn or displacement of the steerable road wheels is relatively large with respect to a relatively small steering input. This is so-called quick state. On the other hand, the variable gear ratio steering device sets the steering angle ratio to a smaller value in a high speed range, at which a steering operation with a large steering input is not required, so that the turn or displacement of the road wheels is relatively small with respect to a relatively large steering input. This is so-called slow state. Meanwhile, the electric power steering apparatus assists a driver's steering wheel torque by making direct use of the driving force of an electric motor, so as to ease the effort required for the steering wheel operation. Therefore, the driver is not required a laboring steering operation.

The variable gear ratio steering device and the electric power steering apparatus are provided with an electric motor, respectively, which is driven by a power supply from a battery. When controlling the drive of each electric motor, in the variable gear ratio steering device, the steering angle ratio is increased or decreased in accordance with a vehicle speed, and in the electric power steering apparatus, the assist steering wheel torque is increased or decreased in accordance with the driver's manual steering wheel torque input.

However, in these vehicles, in order to prevent an engine stop due to decreased voltage of the battery, a consideration is made such that the assistance of the electric power steering apparatus is stopped and the variable control of the steering angle ratio (steering ratio characteristics) with the variable gear ratio steering device is stopped.

However, since the variable gear ratio steering device ensures a large displacement of the road wheels with a small steering input during the quick state in a low speed range, the steering operation cannot be facilitated without assistance of the electric power steering apparatus. If the voltage of the battery lowers when the variable gear ratio steering device is in the quick state, and the assistance of the electric power steering apparatus is lowered or stopped and the variable control of the steering angle ratio with the variable gear ratio steering device is stopped, the movement of the steering wheel becomes heavy. This is not preferable. Meanwhile, in order to prevent the engine stop, decreasing the voltage of the battery has to be restricted. Further, these fail-and-safe actions are preferably carried out without giving an uncomfortable feel to the driver.

In view of the above, the present invention seeks to provide a vehicle, which solves the drawbacks of the prior art.

SUMMARY OF THE INVENTION

According to a first aspect of the invention, there is provided a vehicle including a variable gear ratio steering device and an electric power steering apparatus, the variable gear ratio steering device influencing on a steering system of the vehicle and varying a ratio of a steering angle of steerable road wheels to a steering wheel angle by driving an electric motor in accordance with a vehicle speed, and the electric power steering apparatus influencing on the steering system of the vehicle and providing an assist steering wheel torque by driving an electric motor in accordance with a manual steering wheel torque, the vehicle comprising: a power supply voltage detector for detecting a voltage of a power supply; and a control unit for controlling the electric motor of said variable gear ratio steering device in accordance with the detected voltage, wherein, when the detected voltage decreases to a certain voltage or lower, the control unit brings the variable gear ratio steering device into a slow state and thereafter stops the variable gear ratio steering device.

In such a construction, when the voltage of the power supply decreases to a certain voltage or lower, the variable gear ratio steering device is stopped, thereby saving the life of the power supply or recovering the power supply. This can prevent or restrict occurrence of a trouble, such as an engine stop. It should be noted that when the voltage of the power supply lowers and so does the assist steering wheel torque of the electric power steering apparatus, in some conditions of the variable gear ratio steering device, a difficulty will a rise in a steering operation. Therefore, the variable gear ratio steering device is preferably brought into the slow state (dull) where the steering angle ratio is small, such that the steering operation is carried out with decreased assistance of the assist steering wheel torque. Herein, "a certain voltage" is set higher than the voltage that respective control means (computers) for controlling vehicle-mounted equipment can be operated without any troubles and that is extremely low in comparison with the normal state of use. The certain voltage also indicates the critical voltage, below which the variable gear ratio steering device and/or the electric power steering apparatus may not be operated normally, otherwise the engine may stop when starting the variable gear ratio steering device and/or the electric power steering apparatus. The certain voltage is for example 9.5V.

According to a second aspect of the invention, said control unit reduces assistance of the assist steering wheel torque from the electric motor of said electric power steering apparatus when the detected voltage decreases to the certain voltage or lower, and said control unit stops the assistance of said assist steering wheel torque when the voltage further decreases to a lower limit voltage which is set to be lower than the certain voltage.

In such a construction, assistance of the assist steering wheel force (assist steering wheel torque) of the electric power steering apparatus is reduced when the power supply voltage becomes the certain voltage or lower, and the assistance is stopped under the lower limit voltage, thereby saving the life of the power supply or recovering the power supply. Therefore, reduction of the power supply voltage can be prevented in a reliable manner. The certain voltage may be the same as that recited in the aforementioned construction. The lower limit voltage is defined as a low voltage, in which for example electric equipment may not be actuated but at least the engine can manage to move. The lower limit voltage is for example 8V.

According to a third aspect of the invention, said control unit carries out assistance by decreasing said assist steering wheel torque in accordance with a value of the detected voltage when the detected voltage is between the certain voltage and the lower limit voltage.

In such a construction, assistance is reduced in accordance with the detected voltage, and thereby the power supply is not subject to a heavy load. Further, except that the voltage lowers instantly and abruptly, the driver does not experience any uncomfortable feel even if the driver carries out a steering operation while the voltage lowers. Also, except that the voltage recovers instantly, the driver does not experience any uncomfortable feel during the steering operation even if the voltage recovers and increases.

Preferably, control means is provided for restricting electric power consumption of the equipment which is unnecessary to drive the engine or which does not affect safety of the vehicle, such as an air conditioning system or a car audio system. The control means controls an operation of such equipment based on the detected voltage such that when the detected voltage decreases to the certain voltage or lower, the operation amount of the equipment is preferably reduced or alternatively the equipment is stopped. As mentioned above, a cooperative control of the variable gear ratio steering device and the electric power steering apparatus with other equipment ensures a smooth steering operation as well as an improved battery life extending operation (battery recovering operation).

Further, in the a fore-mentioned constructions, preferably the control unit determines under voltage when the detected voltage decreases to the certain voltage or lower continuously for a certain period of time, and then as a fail-safe action, the control unit reduces assist of the assist steering wheel torque and brings said variable gear ratio steering device into a slow state and thereafter stops said variable gear ratio steering device. Preferably, when the detected voltage decreases to the certain voltage or lower continuously for the certain period of time, the control unit cooperatively controls said variable gear ratio steering device and said electric power steering apparatus with other equipment. This is because the voltage lowers due to noise or voltage fluctuation even in the normal state of use, and a fail-and-safe action is not always required. The lowered voltage due to noise or voltage fluctuation recovers after a relatively short period of time, such as less than 0.2 or 0.5 seconds. Therefore, a judgement can be made as to whether or not a fail-and-safe action is required by setting the certain period of time. An unnecessary fail-and-safe action is avoidable when the voltage lowers in the normal state of use.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENT

With reference to the drawings, a vehicle including a variable gear ratio steering device and an electric power steering apparatus will be described. Herein, the vehicle is not limited to a particular type, and as long as equipped with a motor (engine and/or driving motor), the vehicle may be a normal passenger car, a vehicle for construction work, an advanced specification vehicle, and the like.

The vehicle including a variable gear ratio steering device and an electric power steering apparatus comprises a power supply voltage detector for detecting a voltage of a power supply and a control unit for controlling both an electric motor of the variable gear ratio steering device and an electric motor of the electric power steering apparatus. And when the voltage of the power supply lowers to a certain voltage, the control unit decreases assistance of the electric power steering apparatus (or an assist steering torque) and brings the variable gear ratio steering device into to a slow state. Further, the control unit carries out assistance in accordance with the voltage of the power supply if the voltage is in the range of from the certain voltage to a lower limit voltage. The voltage of the power supply (battery) lowers due to secular deterioration, decreased battery electrolyte level, and the like.

Firstly, constructions of the variable gear ratio steering device and the electric power steering apparatus will be described.

Figure 1:
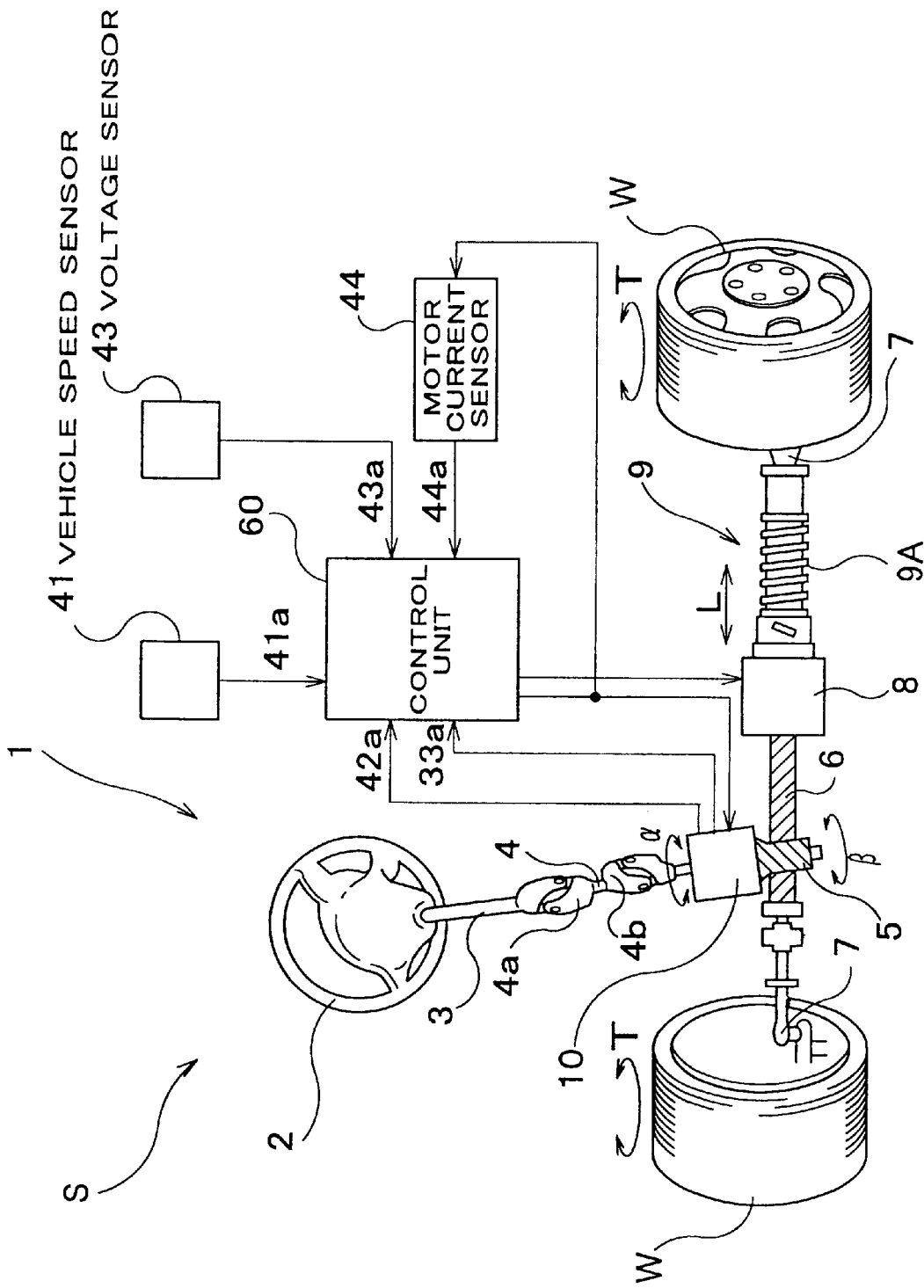
FIG. 1 is a schematic view illustrating the overall arrangement of a variable gear ratio steering device and an electric power steering apparatus according to the invention.

FIG. 1 illustrates the overall arrangement of the variable gear ratio steering device and the electric power steering apparatus. The variable gear ratio steering device and the electric power steering apparatus 1 include a variable gear ratio device 10 and a controller or control unit 60 (referring to FIG. 7). The variable gear ratio device 10 is provided in a steering system S from a steering wheel 2 to steerable road wheels W. The control unit 60 controls the variable gear ratio device 10, viz. a motor for the variable gear ratio steering device (hereinafter referred to as VGS motor) 27 in accordance with a vehicle speed.

In the steering system S, a steering wheel 2 is integrally attached to a steering shaft 3, and a lower end of the steering shaft 3 is connected to an input shaft of the variable gear ratio device 10 via a connecting shaft 4 including a pair of universal joints 4a, 4b. The variable gear ratio device 10 continuously varies the ratio ($\beta/\alpha$) of the rotational angle $\beta$ of the output shaft to the rotational angle a of the input shaft. The output shaft of the variable gear ratio device 10 is provided with a pinion 5. The pinion 5 meshes with rack teeth on a rack shaft 6 such that the rotational movement of the output shaft is converted into the linear movement (L) of the rack shaft 6, which is in turn converted into the steering movement (T) of the front wheels or the steerable road wheels W via tie rods 7 and knuckle arms.

In the variable gear ratio steering device and the electric power steering apparatus 1, a motor for the electric power steering apparatus (hereinafter referred to as EPS motor) 8 for generating an assist steering torque is provided laterally and coaxially of the rack shaft 6. And the rotation of EPS motor 8 is converted into a thrust force via a ball screw mechanism 9 coaxial with the rack shaft 6, and the thrust force works on a rack-ball screw shaft 9A (rack shaft 6). The EPS motor 8 is controlled by the control unit 60 (referring to FIG. 7). The control unit also controls VGS motor 27.

Next, with reference to FIGS. 2 to 4, one embodiment of the variable gear ratio device will be described.

Figure 2:
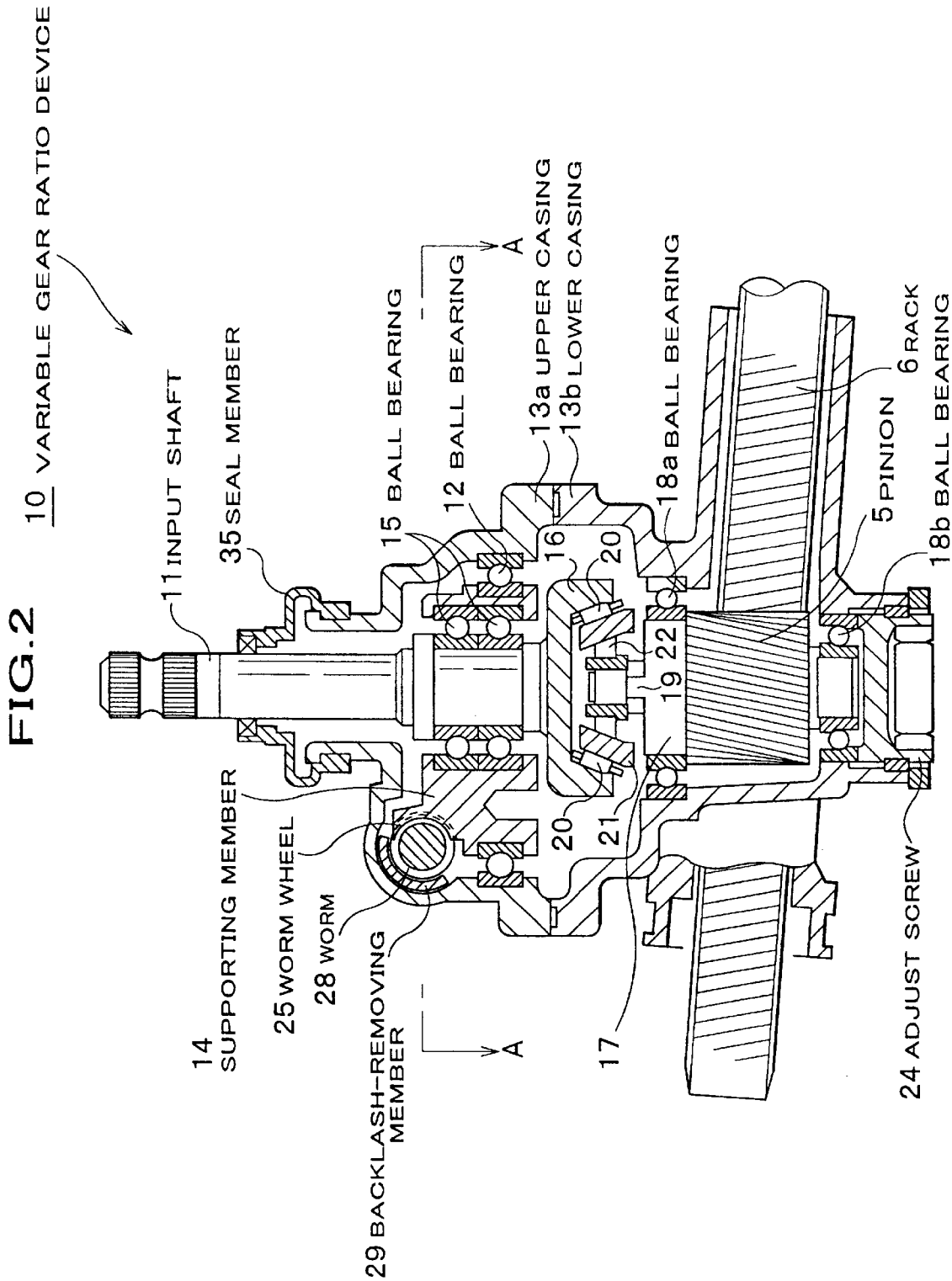
FIG. 2 is a sectional view showing the variable gear ratio steering device of FIG. 1.

As shown in FIG. 2, a supporting member 14 is rotatably supported on an upper casing 13a via a ball bearing 12, and at an offset position of the supporting member 14 the input shaft 11 is rotatably supported via a ball bearing 15. One end of the input shaft 11 is received in a lower casing 13b, and is integrally formed a coupling 16 for transmitting a rotational force to the output shaft 17. The input shaft 11 is also connected to a connecting shaft 4 as illustrated in FIG. 1, therefore the input shaft 11 can be rotated through the connecting shaft 4 with the rotation of the steering wheel 2.

The output shaft 17 is rotatably supported on the lower casing 13b via a pair of ball bearings 18a, 18b. The pinion 5 meshing with the rack shaft 6 is integrally formed on the output shaft 17. One end of the output shaft 17 protrudes into the lower casing 13b. An intermediate shaft 19 projects from the end of the output shaft 17 in a position eccentrically offset from the center of the output shaft 17. The intermediate shaft 19 and the coupling 16 integral with the input shaft 11 are connected via a slider 21 and a tapered roller bearing 22. A pair of flat needle bearings 20 is interposed between the slider 21 and the coupling 16. A seal member 35 having a flexible tubular portion is fitted between the input shaft 11 and the upper casing 13a so as to seal the variable gear ratio device 10.

Figure 3:
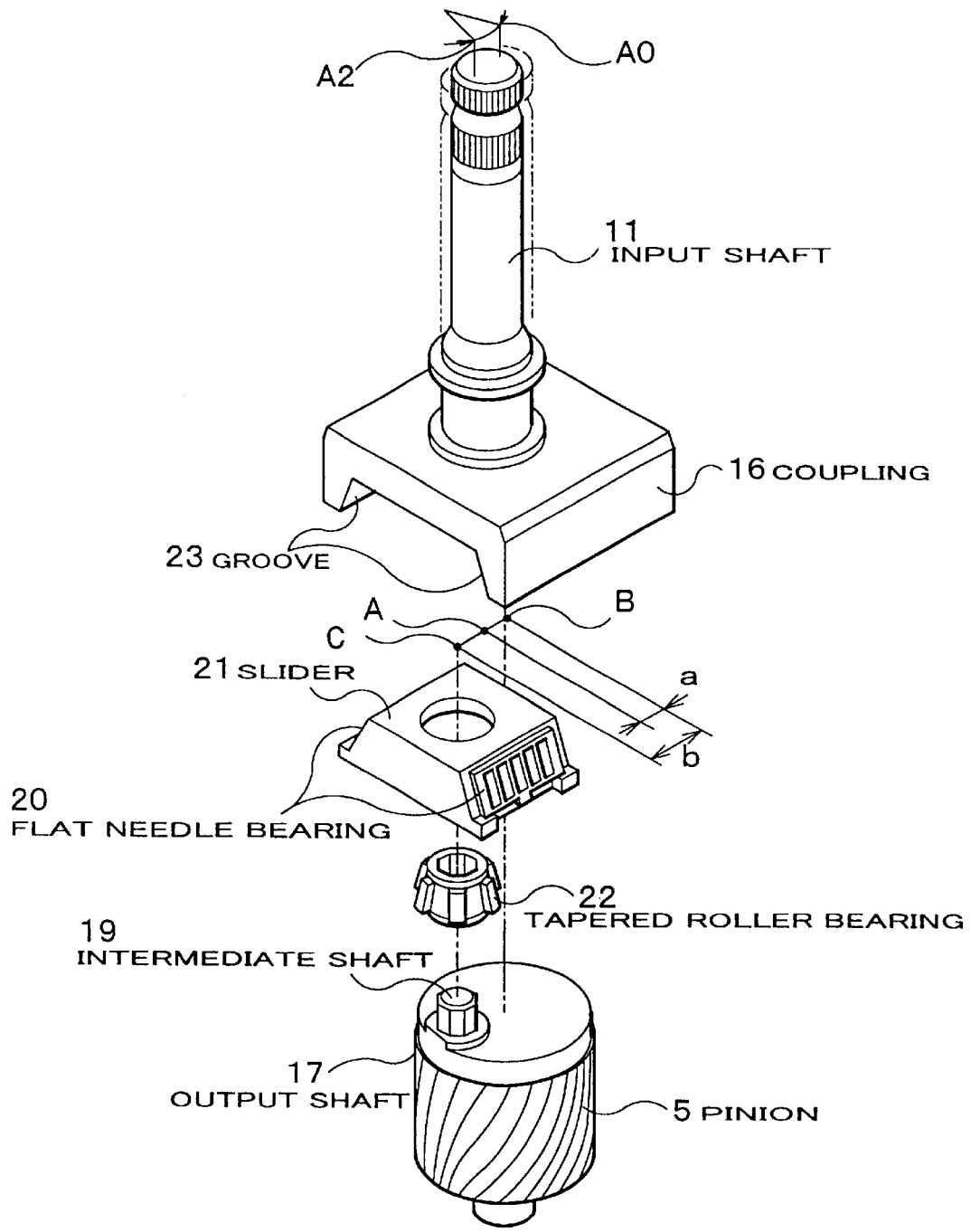
FIG. 3 is an exploded perspective view showing a shaft of the variable gear ratio steering device of FIG. 1.

As best seen in FIG. 3, agroove 23 having a trapezoidal section is formed in the lower surface of the coupling 16. The slider 21 is slidably engaged with the opposing slant surfaces of the groove 23 through the pair of flat needle bearings 20. The intermediate shaft 19 is engaged with the center portion of the lower surface of the slider 21 through the tapered roller bearing 22 so that the intermediate shaft 19 and the tapered roller bearing 22 are relatively rotatable to each other.

As shown in FIG. 2, an adjust screw 24 is threadably fitted into a lower end of the lower casing 13b, and the inner end of this adjust screw 24 abuts on the outer race of the ball bearing 18b supporting the lower end of the output shaft 17 so that, by appropriately turning the adjust screw 24, the pinion 5 is moved axially and a desired preload can be applied between the input shaft 11 and the output shaft 17 with the coupling 16 interposed therebetween. Therefore, it is possible to remove any play which the coupling 16 may have, and improved rigidity of the torque transmitting train can be achieved.

Figure 4:
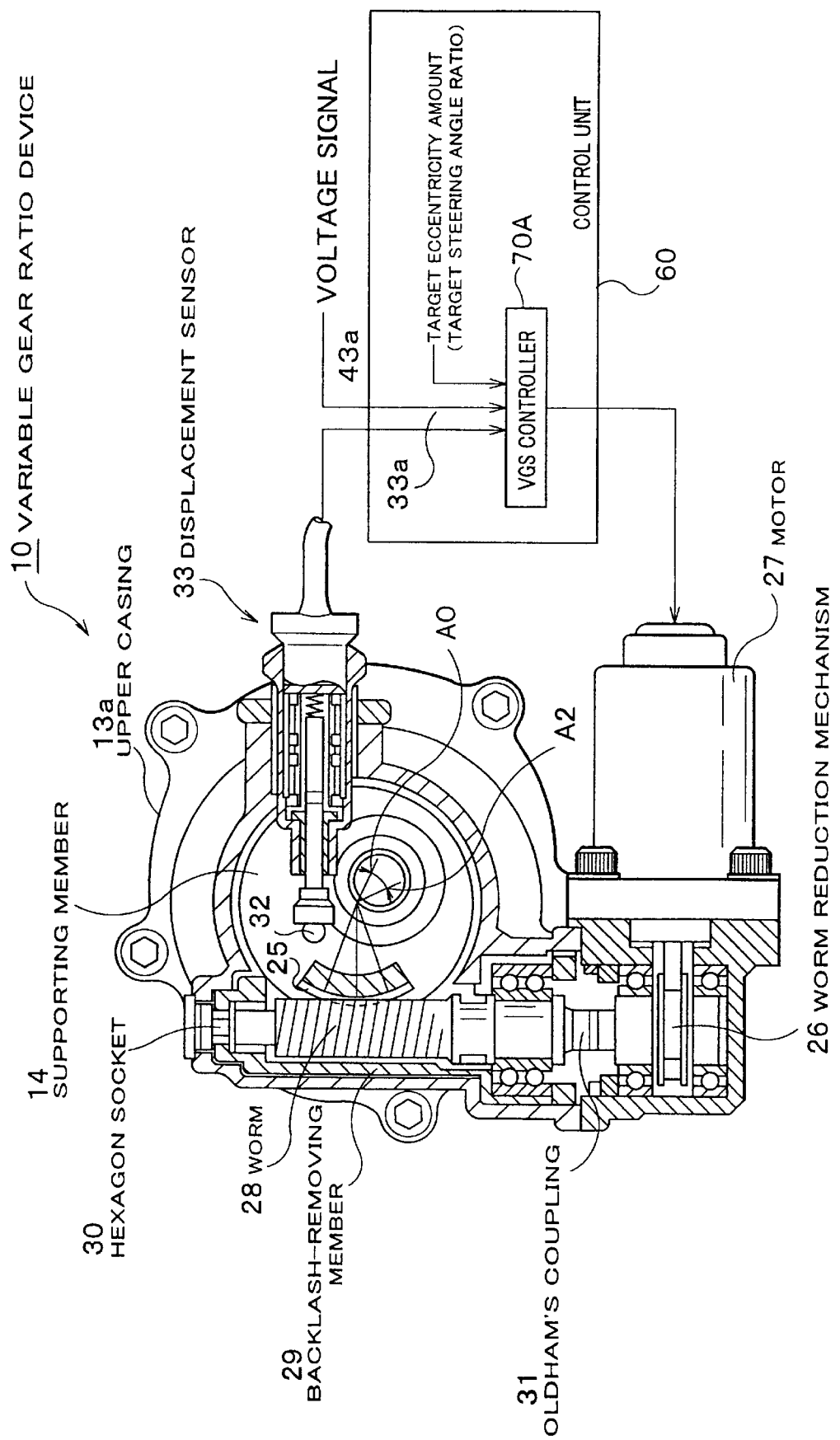
FIG. 4 is a sectional view taken on line A—A in FIG. 2.

As shown in FIG. 4, a fan-shaped partial worm wheel 25 is formed at a part of an outer periphery of the supporting member 14. The partial worm wheel 25 is meshed with a worm 28 which is driven by a motor 27 for the variable gear ratio steering device (hereinafter referred to as VGS motor) via a worm reduction mechanism 26, and when rotating the VGS motor 27, rotational movement can be applied to the supporting member 14 in a predetermined angle range. The worm 28 is supported on the upper casing 13a via a backlash-removing member 29 making use of an eccentric cam. A hexagon socket 30 is formed at one end of the backlash-removing member 29, and when inserting a hexagon coupling bolt into the hexagon socket 30 and turning the same with regard to the upper casing 13a, the center of axis of the backlash-removing member 29 displaces so as to vary the meshing point with the partial worm wheel 25. Further, in order to allow displacement of the center of axis of the worm 28, the worm 28 and the worm reduction mechanism 26 are connected via Oldham's coupling 31.

A displacement sensor 33, such as a differential transformer, is mounted on the upper casing 13a so as to engage with a pin 32 projecting from the upper surface of the supporting member 14. The displacement sensor 33 detects the rotational angle of the supporting member 14. The rotation amount detected by the displacement sensor 33, viz. an eccentricity amount signal (actual eccentricity amount) 33a of the input shaft 11 which is supported by the supporting member 14 is outputted as a digital signal to VGS controller 70A in the control unit 60.

Figure 7:
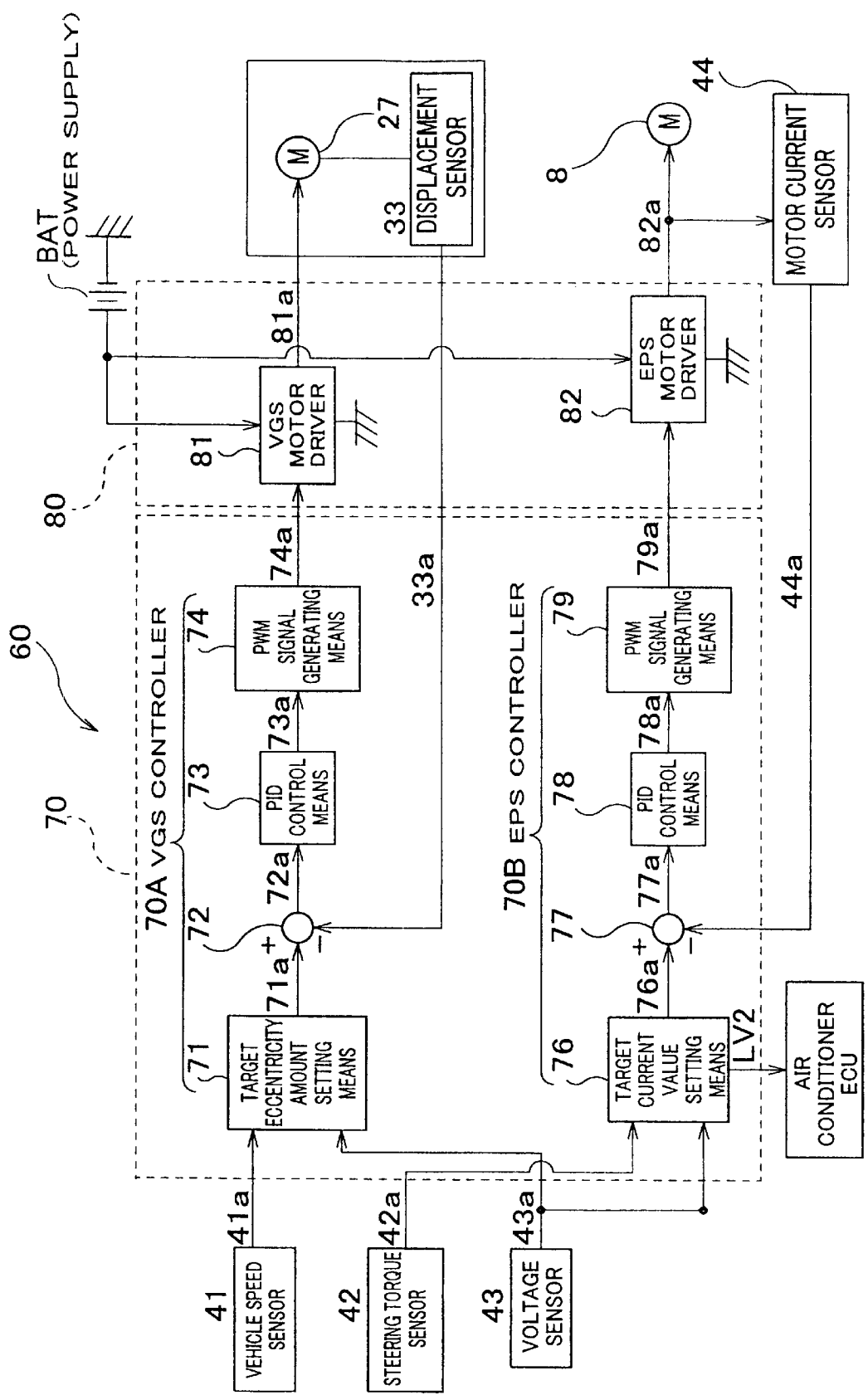
FIG. 7 is a block diagram showing a control unit of the variable gear ratio steering device.

As shown in FIG. 7, the VGS controller 70A drives the VGS motor 27 by feedback control in such a way that the target eccentricity amount 71a corresponding to the steering angle ratio which is set based on the vehicle speed (viz. the target steering angle ratio) coincides with the actual eccentricity amount (equivalent to the actual steering angle ratio) 33a detected by the displacement sensor 33.

Figure 5:
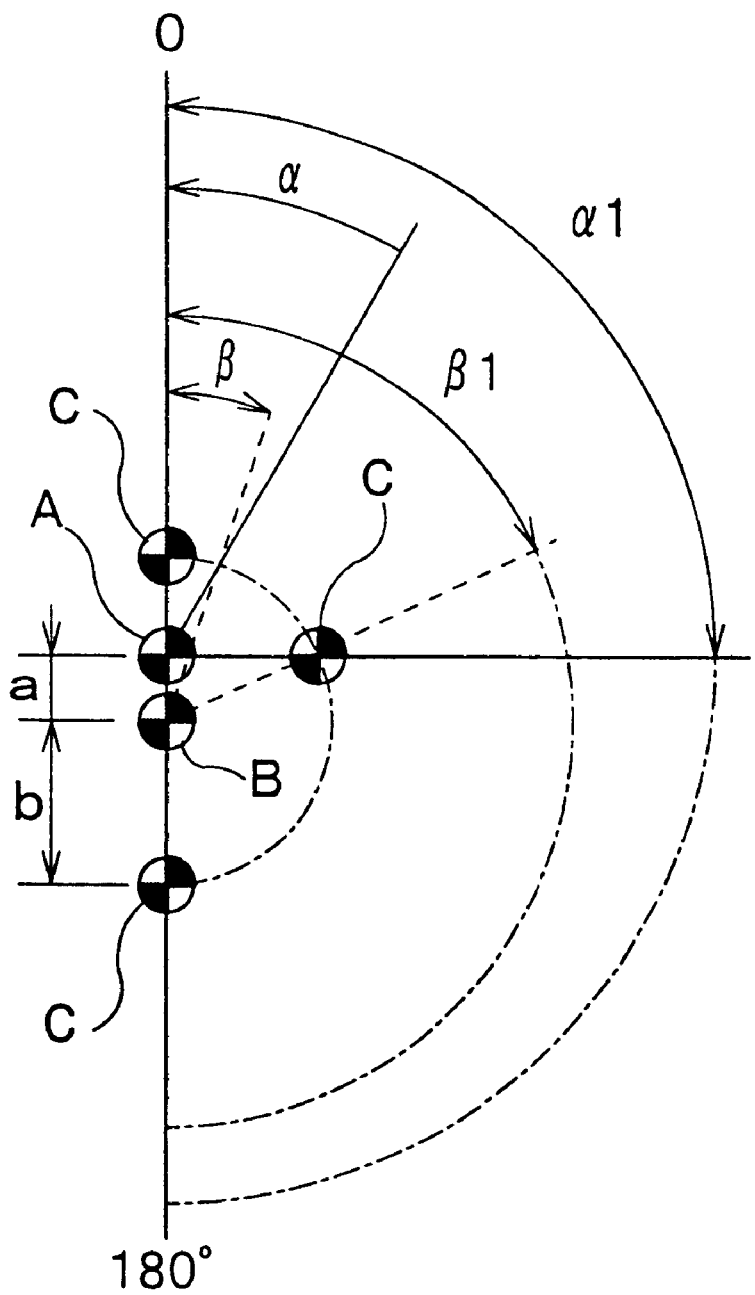
FIG. 5 is an explanatory view showing the working principal of the variable gear ratio steering device.
Figure 6:
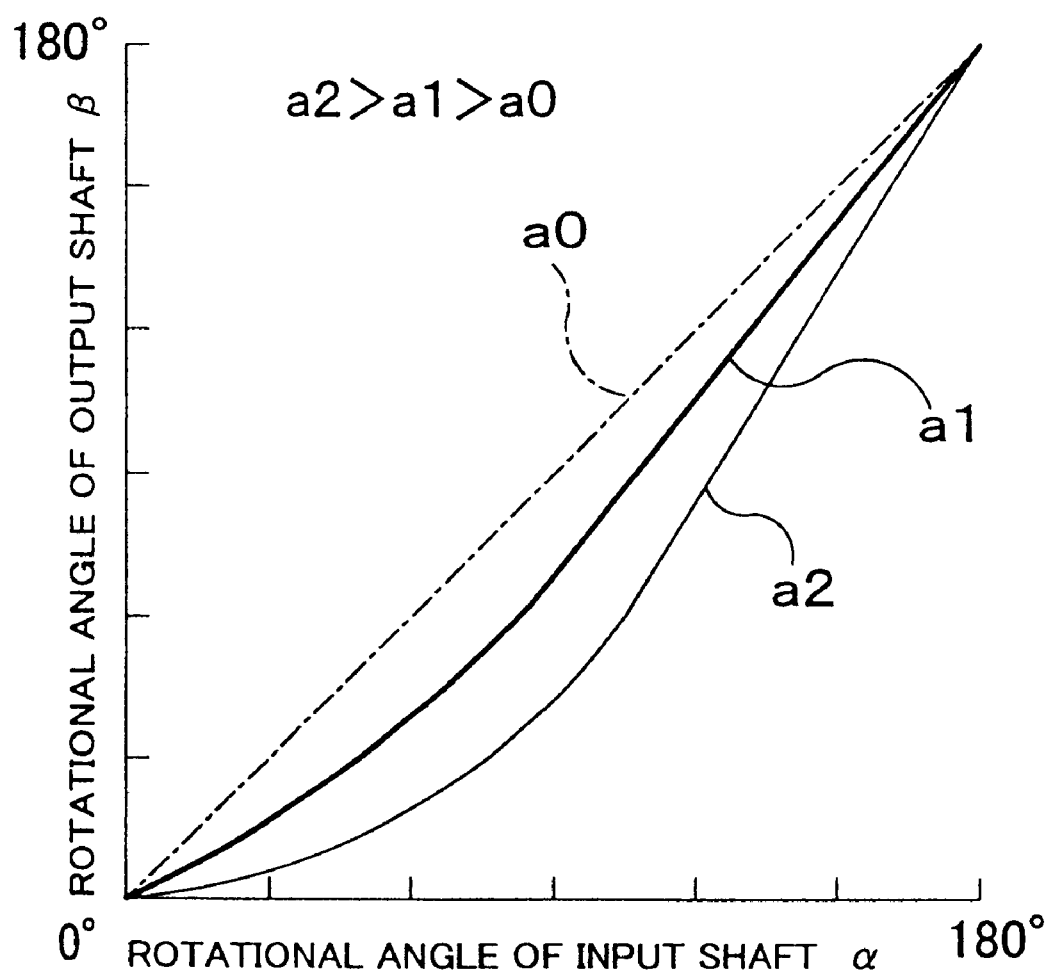
FIG. 6 is a graph showing steering ratio characteristics of the variable gear ratio steering device.

Operational principle of the variable gear ratio steering device will now be described with reference to FIGS. 5 and 6, in which FIG. 5 is an explanatory view showing the working principal of the variable gear ratio steering device, and FIG. 6 is a graph showing input angle/output angle characteristics indicating the steering ratio characteristics of the variable gear ratio steering device.

In the diagram of FIG. 5, A and B denote the rotational centers of the input shaft 11 and the output shaft 17, C denotes the point of engagement of the intermediate shaft 19, b denotes the distance between B and C, a denotes the eccentricity amount between the input shaft 11 and the output shaft 17 or the distance between A and B, α denotes the rotational angle of the input shaft 11 or the steering angle of the steering wheel 2, and β denotes the rotational angle of the output shaft 17 or the rotational angle of the pinion 5. According to the geometric relationship between the various parts, the following mathematical relationship holds:

$$b \cdot \sin \beta = (b \cdot \cos \beta - a) \tan \alpha$$

This can be also written as given in the following:

$$\alpha = \tan^{-1}(b \cdot \sin \beta / (b \cdot \cos \beta - a))$$

When the input shaft 11 is turned by the driver's steering wheel operation, the intermediate shaft 19 turns in the manner of a crank around the axial center of the output shaft 17 by virtue of the engagement between the coupling 16 of the input shaft 11 and the slider 21. As best seen in FIG. 5, when the rotational angle α1 of the input shaft 11 is 90 degrees, the output shaft 17 takes a rotational angle as shown in the same figure.

Further, by turning the supporting member 14, the eccentric cam action of the supporting member 14 makes the center of axis of the input shaft 11 change in the range of between A0 and A2 indicated in FIGS. 3 and 4. Because of the change in the center of axis of the input shaft 11, when the eccentricity amount a between the input shaft 11 and the output shaft 17 is determined to a certain value and the centers of axes of the input shaft 11 and the output shaft 17 are positioned eccentrically to each other, the rotational angle of the output shaft 17 is not generally proportional to the rotational angle of the input shaft 11. More specifically, as indicated by the solid lines a1 and a2 given in FIG. 6, the change in the angle of the output shaft 17 for a given increment of the rotational angle of the input shaft 11 progressively increases as the rotational angle of the input shaft 11 increases.

When the eccentricity amount a between the centers of axes of the input shaft 11 and the output shaft 17 is continuously changed within the range of between a2 to a0 (a2>a1>a0=0), it is possible to change the ratio ($\beta/\alpha$) of the rotational angle of the output shaft 17 for a given rotational angle of the input shaft 11 or the effective steering angle ratio. If the eccentricity amount a between the input shaft 11 and the output shaft 17 is increased, progressiveness is enhanced as to the rate of change of the output angle $\beta$ for the input angle $\alpha$, and if the eccentricity amount a is 0, the input angle $\alpha$ is equal to the output angle $\beta$, as indicated by the dashed line (a0) given in FIG. 6.

If the change of the steering angle ratio is controlled in such a way that it shifts to a0 in a low speed vehicle cruising range and to a2 in a high speed vehicle cruising range, more sensitive response or quick characteristics can be achieved in the low speed vehicle cruising range with the rate of the rack stroke for the steering angle $\alpha$ of the steering wheel set higher than the conventional steering apparatus. Meanwhile, less sensitive response or dull and slower characteristics can be achieved in the high speed vehicle cruising range with the rate of the rack stroke for the steering angle a of the steering wheel set lower than the conventional steering apparatus. Therefore, the relation between the effective steering angle and the vehicle cruising speed can be a flat characteristic.

Figure 8:
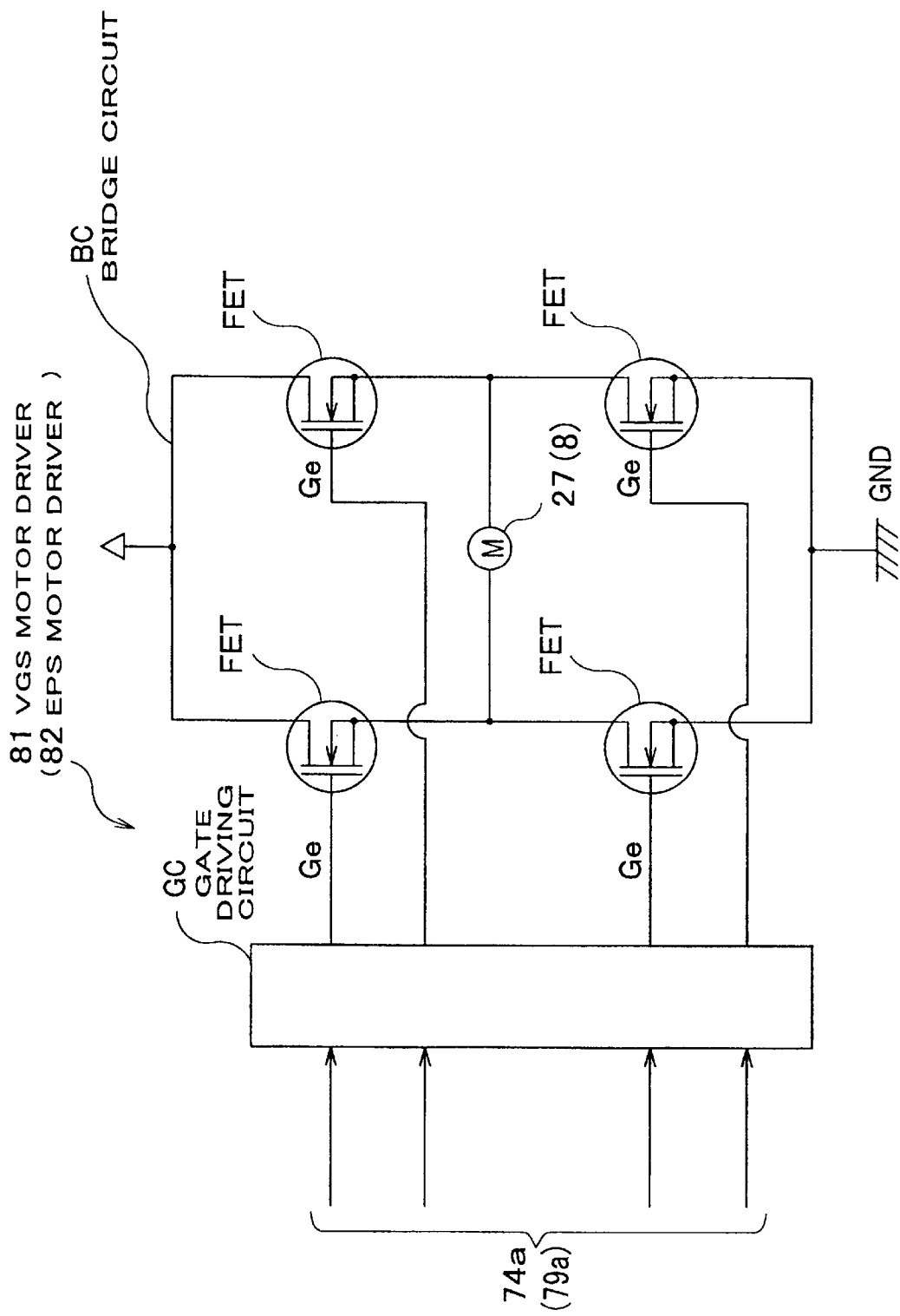
FIG. 8 shows a construction of a motor driver of FIG. 7.

Next, with reference to FIGS. 7 and 8, a control unit for a vehicle including the variable gear ratio steering device and the electric power steering apparatus will be described, in which FIG. 7 is a block diagram showing a control unit of the variable gear ratio steering device according to this preferred embodiment, and FIG. 8 shows a construction of a motor driver of FIG. 7.

As shown in FIG. 7, the control unit 60 comprises a controller 70 and a motor driver 80. The variable gear ratio steering device and the electric power steering apparatus 1 comprise a vehicle speed sensor 41 for detecting vehicle speed, a steering torque sensor 42 for detecting manual steering torque, a voltage sensor 43 as a power supply voltage detector, a motor current sensor 44 for detecting electric current supplied to the motor, and the aforementioned displacement sensor 33. The vehicle speed sensor 41 is for outputting a vehicle speed signal 41a corresponding to the revolutions of the output shaft of the non-shown transmission, the steering torque sensor 42 is for outputting a steering torque signal 42a corresponding to a manual steering torque of the driver, and the voltage sensor 43 detects an ignition voltage (hereinafter referred to as IG voltage) and outputs a voltage signal 43a. The IG voltage is lower than the battery voltage. The motor current sensor 44 detects an electric current supplied to EPS motor 8 and outputs a current signal 44a. In these sensors, a non-shown AD converter converts the signal into a digital signal. These equipments such as the control unit 60 and motors 8, 27 are driven by the power supply BAT as a power source (12V). The controller 70 and the like can be operated at 5V.

As shown in FIG. 7, the controller 70 comprises VGS controller 70A and EPS controller 70B. As hardware constitution, the controller 70 is equipped with an input/output interface to the displacement sensor 33, the vehicle speed sensor 41, the steering torque sensor 42, the voltage sensor 43, the motor current sensor 44, the VGS motor driver 81, the EPS motor driver 82 and the like, ROM which stores various data and programs, RAM which provisionally stores various data, and logic circuits for various calculating processes. Meanwhile, the VGS motor driver 81 and the EPS motor driver 82 of the motor driver 80 are each equipped with a gate driving circuit GC and a bridge circuit BC, such as shown in FIG. 8.

[VGS Controller & VGS Motor Driver]

VGS controller controlling the variable gear ratio steering device will be described below.

As shown in FIG. 7, VGS controller 70A controlling the variable gear ratio steering device comprises a target eccentricity amount setting means 71, a deviation calculating means 72, a PID control means 73 and PWM signal generating means 74.

The target eccentricity amount setting means 71 is equipped with ROM and the like and sets the target eccentricity amount 71a of the variable gear ratio device 10 in order to obtain certain steering characteristics (or steering angle ratio) in accordance with a vehicle speed. For this reason, the target eccentricity amount setting means 71 map-searches the target eccentricity amount 71a (71Aa) from the data area with the use of a vehicle speed signal 41a inputted as a digital signal, and then outputs the result to the deviation calculating means 72. The map of the vehicle speed signal 41a and the target eccentricity amount 71a (71Aa) is set based on experimental results or logic operations so that the target eccentricity amount becomes larger as the vehicle speed increases. The target eccentricity amount setting means 71 sets the maximum eccentricity amount as the target eccentricity amount 71a when the voltage signal 43a digitalized and inputted decreases to a certain voltage (9.5V in this embodiment) or lower. This will be described later.

The deviation calculating means 72 has a subtracter as hardware or a subtracting function controlled by software. The target eccentricity amount 71a from the target eccentricity amount setting means 71 and the digitalized actual eccentricity amount 33a from the displacement sensor 33 are inputted into the deviation calculating means 72, and the deviation calculating means 72 outputs the deviation signal 72a to the PID control means 73.

The PID control means 73 is equipped with a logic circuit and the like, and carries out an operation such as P (proportion), I (integration) and D (differentiation) with regard to the deviation signal 72a from the deviation calculating means 72. And in order to make the deviation closer to zero, the PID control means generates and outputs a drive control signal 73a which indicates a direction of the electric currents supplied to the motor 27 and its current value.

The PWM signal generating means 74 is equipped with a logic circuit and the like. The PWM signal generating means 74 generates and outputs a PWM (pulse width modulation) signal 74a, which is corresponding to the current value and the polarity of the drive control signal 73a, to the motor driver 80 (VGS motor driver 81).

As shown in FIG. 8, the VGS motor driver 81 is equipped with a gate drive circuit GC and a bridge circuit BC. The bridge circuit BC comprises four field effect transistors FET, and each gate Ge of the field effect transistor FET is driven by the gate drive circuit GC. With such arrangement, the VGS motor 27 is PWM-driven corresponding to the duty ratio of the PWM signal, ON signal and OFF signal.

Figure 9:
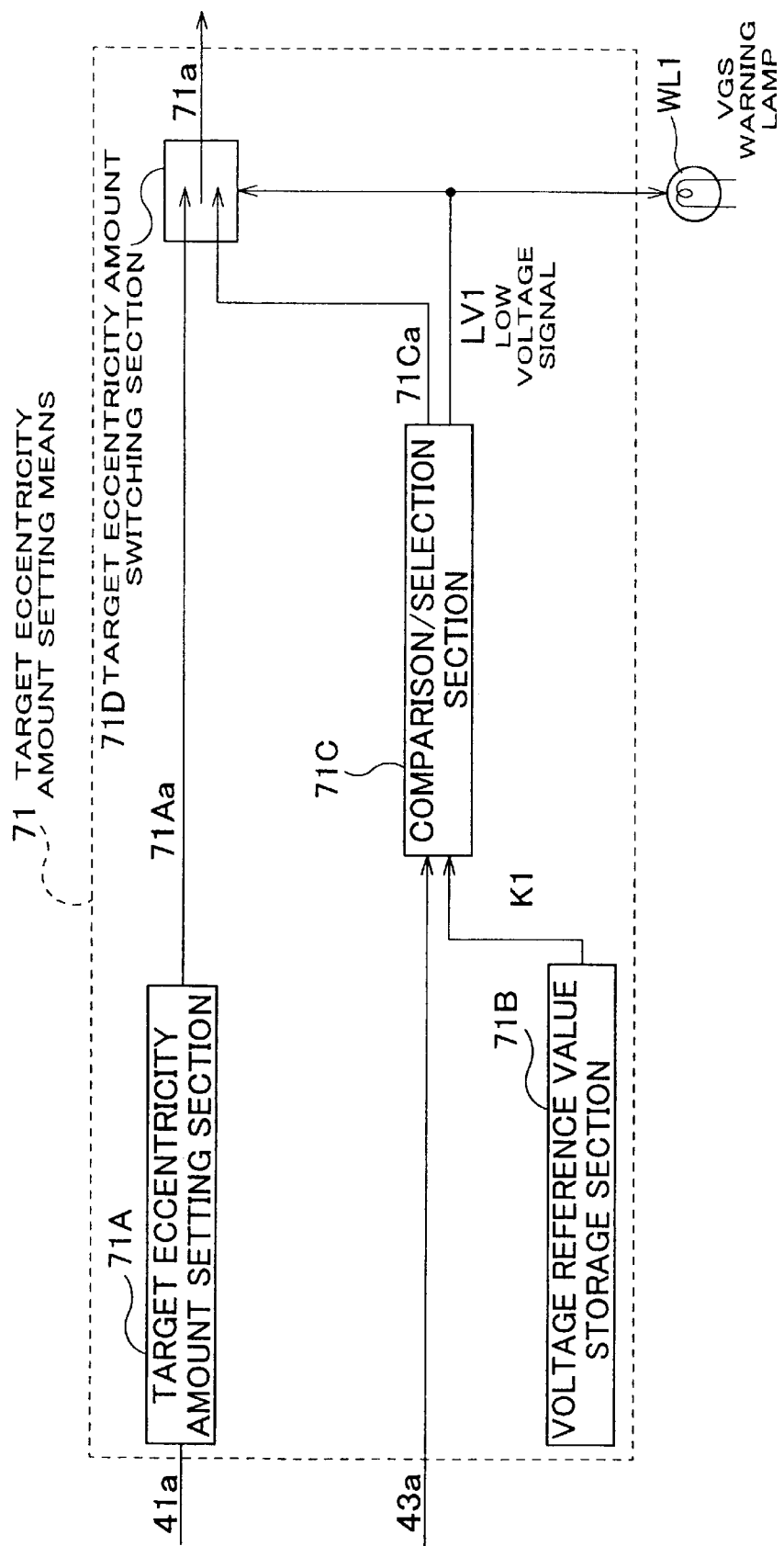
FIG. 9 is a block diagram showing a target eccentricity amount setting means of FIG. 7.

With reference to FIG. 9, details of the aforementioned target eccentricity amount setting means 71 will be described, which, in the normal state, sets the target eccentricity amount 71a in accordance with the vehicle speed or the vehicle speed signal 41a, and which sets the target eccentricity amount 71a for the maximum value when the voltage decreases to a certain voltage K1 or lower. Herein, FIG. 9 is a block diagram showing details of the target eccentricity amount setting means.

As shown in FIG. 9, the target eccentricity amount setting means 71 comprises at least a target eccentricity amount setting section 71A, a voltage reference value storage section 71B, a comparison/selection section 71C, and a target eccentricity amount switching section 71D.

The target eccentricity amount setting section 71A is equipped with ROM and the like. The target eccentricity amount setting section 71A map-searches the target eccentricity amount 71Aa from the data area with the use of the digitalized vehicle speed signal 41a, and outputs the result. As mentioned above, the map is set so that the target eccentricity amount 71Aa becomes larger as the vehicle speed signal 41a increases.

The voltage reference value storage section 71B is equipped with ROM and the like, and stores the certain voltage K1. In this embodiment, the certain voltage K1 is 9.5V for IG voltage. The certain voltage K1 is inputted to the comparison/selection section 71C to be described later.

The comparison/selection section 71C is equipped with a logic circuit, ROM, a comparator and the like. The comparison/selection section 71C compares the digitalized voltage signal 43a and the certain voltage K1, and determines whether the voltage signal 43a is less than the certain voltage K1, that is whether or not in a low voltage state. And based on the comparison result, it outputs a low voltage signal LV1 to the target eccentricity amount switching section 71D. Herein, the low voltage signal LV1 is an H level signal when in the low voltage state and is an L level signal when in the normal state. The low voltage state is determined when the voltage signal 43a is lower than the certain voltage K1 continuously for over 0.5 seconds. Further, the comparison/selection section 71C selects and outputs the target eccentricity amount 71Ca that is stored in the data area to the target eccentricity amount switching section 71D when the low voltage state is determined. Herein, the target eccentricity amount 71Ca in the low voltage state is to bring the eccentricity amount of the variable gear ratio device 10 to the maximum (or the proximity of the maximum value) so as to achieve the slowest steering ratio characteristics.

The target eccentricity amount switching section 71D is equipped with a switching element and the like, and based on the level (H or L) of the low voltage LV1 from the comparison/selection section 71C, it switches the target eccentricity amounts 71Aa and 71Ca to be inputted. More specifically, when the low voltage signal LV1 is at L level, which is not in the low voltage state, the target eccentricity amount switching section 71D outputs the target eccentricity amount 71Aa from the target eccentricity amount setting section 71A as the target eccentricity amount 71a to the deviation calculating means 72 (FIG. 7) to be described later. Meanwhile, when the low voltage signal LV1 is at H level, which is in the low voltage state, the target eccentricity amount switching section 71D outputs the target eccentricity amount 71Ca in the low voltage state as the target eccentricity amount 71a to the deviation calculating means 72 to be described later. Accordingly, when turning to the low voltage state, the steering ratio characteristic swiftly shifts to the slow state (as a fail-safe performance), thereby facilitating the driver's steering operation. Such a fail-safe action continues until the eccentricity amount increases to the maximum, even if the voltage of the battery BAT decreases to 8V (a lower limit voltage K2 to be described later) or lower while the eccentricity amount is enlarged.

When turning to the low voltage state, the VGS controller 70A lights on VGS warning lamp WL1 so as to indicate the driver that the variable gear ratio steering device is in the slow state, viz. the operation of the variable gear ratio steering device is stopped. For this reason, the comparison/selection section 71C outputs the low voltage signal LV1, which is based on the judgement result whether or not in the low voltage state, to the VGS warning lamp WL1. The VGS warning lamp WL1 is lit when the low voltage signal LV1 at H level is inputted.

However, if the low voltage signal LV1 at H level is once inputted, it is retained until the ignition switch is turned OFF and then turned ON, and the low voltage signal LV1 is released and changed from H level to L level when the voltage of the power supply BAT is more than 9.5V upon turning ON the ignition switch. Alternatively, the low voltage signal LV1 is released and changed from H level to L level when the system reset is performed and the voltage of the power supply BAT after reset is more than 9.5V. Therefore, once the low voltage state is determined, even if the voltage recovers over 9.5V (9.68V or more), the low voltage signal LV1 at H level is not changed to the low voltage signal LV1 at L level and the variable gear ratio steering device remains in the slowest state unless performing ON-and-OFF operations of the ignition switch. And the VGS warning lamp WL1 also remains ON. Unstableness of the system or the device is thereby overcome.

With such a construction, switching means is preferably provided in the power supply line between the power supply BAT and the VGS motor driver 81 to switch ON and OFF the power supply line so that the switching means is OFF when in the low voltage state and the actual eccentricity amount 33a of the displacement sensor 33 is proximate to the maximum value, thereby stopping the supply from the power supply BAT to the VGS motor driver 81. This is for securely preventing decrement of the voltage of the power supply BAT. Preferably, the switching means turns ON when the voltage is over 9.5V after turning OFF and turning ON the ignition switch. This is for conforming to the indication of the VGS warning lamp WL1.

[EPS Controller & EPS Motor Driver]

EPS controller for controlling the electric power steering apparatus will be described.

As shown in FIG. 7, the EPS controller 70B for controlling the electric power steering apparatus comprises a target current value setting means 76, a deviation calculating means 77, a PID control means 78 and PWM signal generating means 79.

The target current value setting means 76 sets a target current 76a of the EPS motor 8 in order to obtain a certain assist steering torque in accordance with a manual steering torque. Forth is reason, the target current value setting means 76 is equipped with ROM and the like. The target current value setting means 76 map-searches the target current 76a (76Aa) from the data area with the use of a steering torque signal 42a inputted as a digital signal, and then outputs the result to the deviation calculating means 77. The map of the steering torque signal 42a and the target current 76a (76Aa) is set based on experimental results or logic operations so that the target current becomes larger as the steering torque signal 42a increases. The target current value setting means 76 decreases the target current value 76a when the voltage signal 43a digitalized and inputted decreases to a certain voltage k1 (K1=9.5V in this embodiment) or lower, and makes the target current value 76a zero when the voltage signal 43a decreases to a lower limit voltage K2 (k2=8V in this embodiment) or lower. When the voltage signal 43a is between K1 and K2, the target current value setting means 76 decreasingly corrects the target current value 76a in accordance with the value of the voltage signal 43a and generates an assist steering torque. This will be described later.

The deviation calculating means 77 has a subtracter as hardware or a subtracting function controlled by software. The target current value 76a from the target current value setting means 76 and the digitalized current signal (or current value) 44a from the motor current sensor 44 are inputted into the deviation calculating means 77, and the deviation calculating means 77 outputs the deviation signal 77a to the PID control means 78.

The PID control means 78 is equipped with a logic circuit and the like, and carries out an operation such as P (proportion), I (integration) and D (differentiation) with regard to the deviation signal 77a from the deviation calculating means 77. And in order to make the deviation closer to zero, the PID control means generates and outputs a drive control signal 78a, which indicates a direction of the electric currents supplied to the EPS motor 8 and its current value.

The PWM signal generating means 79 is equipped with a logic circuit and the like. The PWM signal generating means 79 generates and outputs a PWM signal 79a, which is corresponding to the current value and the polarity of the drive control signal 78a, to the motor driver 80 (EPS motor driver 82).

As shown in FIG. 8 and similar to the VGS motor driver 81, the EPS motor driver 82 is equipped with a gate drive circuit GC and a bridge circuit BC. The bridge circuit BC comprises four field effect transistor FET, and each gate Ge of the field effect transistor FET is driven by the gate drive circuit GC. With such arrangement, the EPS motor 8 is PWM-driven corresponding to the duty ratio of the PWM signal, ON signal and OFF signal.

With reference to FIG. 10, details of the aforementioned target current value setting means 76 will be described, which, in the normal state, sets the target current value 76a in accordance with the manual steering torque or the steering torque signal 42a, and which decreasingly corrects the target current value 76a in accordance with the value of the voltage signal 43a when the voltage is between the certain voltage K1 and the lower limit voltage K2.

Figure 10A:
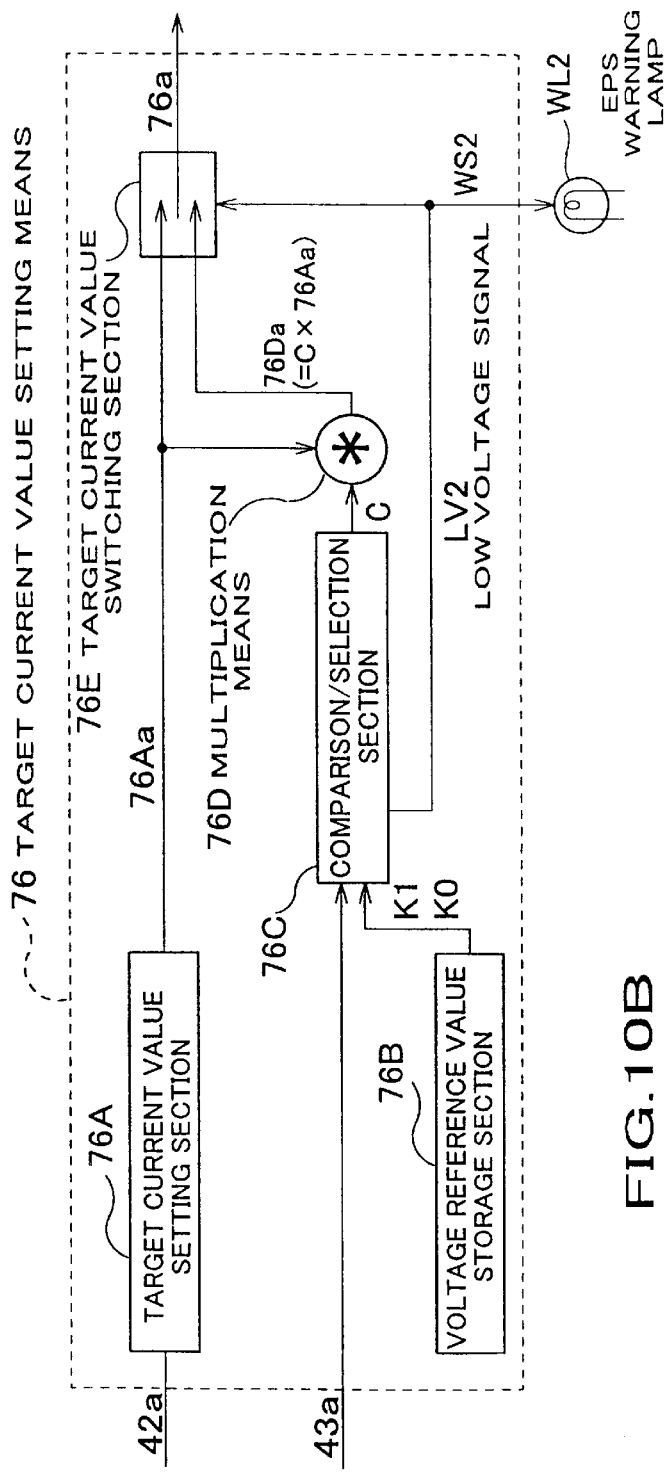
FIG. 10A is a block diagram showing details of a target current value setting means of FIG. 7.

As shown in FIG. 10A, the target current value setting means 76 comprises at least a target current value setting section 76A, a voltage reference value storage section 76B, a comparison/selection section 76C, multiplication means 76D, and a target current value switching section 76E. Herein, FIG. 10A is a block diagram showing details of the target current value setting means 76.

The target current value setting section 76A is equipped with ROM and the like. The target current value setting section 76A map-searches the target current value 76Aa from the data area with the use of the digitalized steering torque signal 42a, and outputs the result. As mentioned above, the map is set so that the target current value 76Aa becomes larger as the steering torque signal 42a increases.

The voltage reference value storage section 76B is equipped with ROM and the like, and stores the certain voltage K1. The certain voltage K1 is 9.5V for IG voltage, which is the same as the above-described certain voltage K1 stored in the voltage reference value storage section 71B of the target eccentricity amount setting means 71.

Figure 10B:
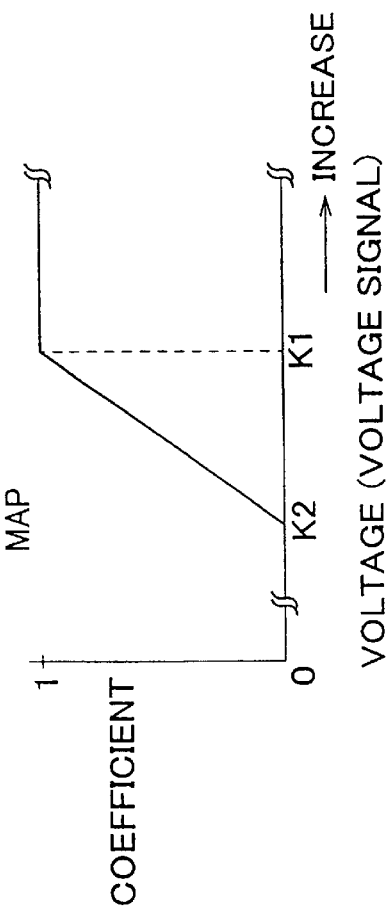
FIG. 10B is a map showing relations between voltage signal to be looked up at a target current value setting section and correction coefficient.

The comparison/selection section 76C is equipped with a logic circuit, ROM, a comparator and the like. The comparison/selection section 76C compares the digitalized voltage signal 43a and the certain voltage K1, and determines whether the voltage signal 43a is less than the certain voltage K1, that is whether or not in the low voltage state. Because the basis of the judgement is exactly the same as the comparison/selection section 71C of the aforementioned target eccentricity amount setting means 71, further explanation will be omitted. Further, the comparison/selection section 76C searches the map, which is stored in the data area, with the use of the voltage signal 43a as an address, and outputs the corresponding correction coefficient C to the multiplication means 76D to be described later. The map is shown in FIG. 10B. In this map, when the voltage (or the voltage signal 43a) is at the certain voltage K1 or more, the correction coefficient C is "1", and when the voltage is at the lower limit voltage K2 or less, the correction coefficient C is "0". And when the voltage is between the certain voltage K1 and the lower limit voltage K2, the correction coefficient C decreases in proportion to the voltage. With the provision of the map, the comparison/selection section 76C does not have to compare (determine) the voltage signal 43a and the lower limit voltage K2. Also, the voltage reference value storage section 76B does not have to store the lower voltage K2. As a result, the overall arrangement of the system can be simplified.

Further, the comparison/selection section 76C outputs the low voltage signal LV2 to the target current value switching section 76E based on the comparison result. Similar to the low voltage signal LV1, the low voltage signal LV2 is an H level signal when in the low voltage state and is an L level signal when in the normal state.

The multiplication means 76D has a multiplier as hardware or a multiplying function controlled by software. The multiplication means 76D multiplies the target current value 76Aa outputted from the target current value setting section 76A by the correction coefficient C outputted from the comparison/selection section 76C, and outputs the thus corrected target current value 76Da (=C×76Aa) to the target current value switching section 76E.

The target current value switching section 76E is equipped with a switching element and the like, and based on the level (H or L) of the low voltage signal LV2 from the comparison/selection section 76C, it switches the target current value 76Aa and 76Da to be inputted. More specifically, when the low voltage signal LV2 is at L level, which is not in the low voltage state, viz. in the normal state, the target current value switching section 76E outputs the target current value 76Aa from the target current value setting section 76A as the target current value 76a to the deviation calculating means 77 (FIG. 7) to be described later. Meanwhile, when the low voltage signal LV2 is at H level, which is in the low voltage state, the target current value switching section 76E outputs the corrected target current value 76Da in the low voltage state as the target current value 76a to the deviation calculating means 77 to be described later. Accordingly, when turning to the low voltage state, the assist steering torque is decreasingly corrected in accordance with the voltage of the power supply BAT. Therefore, the driver does not experience any uncomfortable feel. Preferably, decreasing the assist amount may be carried out in accordance with voltage, rather than in accordance with time. This is because the power supply BAT is not subject to a heavy load. Namely, in the case that the assist amount is decreased in accordance with time, a greater assist amount may be required even if the voltage abruptly drops, which leads to acceleration of decreased voltage of the power supply BAT.

When turning to the low voltage state, the EPS controller 70B lights on EPS warning lamp WL2 so as to indicate the driver that the assist amount of the electric power steering apparatus is decreased. For this reason, the comparison/selection section 76C outputs the low voltage signal LV2, which is based on the judgement result whether or not in the low voltage state, to the EPS warning lamp WL2. The EPS warning lamp WL2 is lit when the low voltage signal LV2 at H level is inputted.

When the voltage of the power supply BAT recovers, the EPS controller 70B changes the low voltage signal LV2 from H level to L level so as to assist with the normal assist steering torque. Whether or not the voltage of the power supply BAT has been recovered is determined based on the judgement whether the voltage (IG voltage) is over 9.68V continuously for more than 0.5 seconds.

Such conditions may be determined in consideration of noise, hysteresis and the like.

For this reason, the voltage reference value storage section 76B of the aforementioned EPS controller 70B (or the target current value setting means 76) stores a recovery voltage K0 other than the certain voltage K1. The value of the recovery voltage K0 is 9.68V as previously mentioned in relation to the IG voltage. Other than the aforementioned comparative function made by the comparator and the like, the comparison/selection section 76C has another comparative function to compare the voltage signal 43a and the recovery voltage K0 and to determine whether the voltage signal 43a is over the recovery voltage K0 continuously for more than 0.5 seconds.

The comparison/selection section 76C determines that the voltage of the power supply BAT has been recovered, if the voltage signal 43a is over the recovery voltage K0 continuously for more than 0.5 seconds. When the voltage recovers, the comparison/selection section 76C changes the level of the low voltage signal LV2 from H level to L level. Therefore, the EPS warning lamp WL2 is turned off. At the same time, the target current value 76a selected at the target current value switching section 76E is switched to the target current 76Aa outputted from the target current value setting section 76A, thereby allowing an assistance with the normal assist steering torque. Meanwhile, when the voltage is over 9.5V, the correction coefficient C is "1", and therefore the assistance is carried out with the normal assist steering torque regardless of the level of the low voltage signal LV2.

As mentioned above, the variable gear ratio steering device and the electric power steering apparatus have different recovery conditions upon recovering the voltage of the power supply BAT. This is because the electric power steering apparatus affects the driver's steering operation rather than the variable gear ratio steering device. Also, it is not preferable to operate the variable gear ratio steering device under unstable conditions of the power supply BAT. If the variable gear ratio steering device is continuously operated under unstable conditions of the power supply BAT, it may stop in the quick state when the voltage again drops.

[Air Conditioner ECU]

In the case that the vehicle is equipped with an air conditioning system (hereinafter referred to as an "air conditioner"), the controller 70 sends a low voltage signal LV2 to an air conditioner ECU which entirely controls the air conditioner, as indicated in FIG. 7. The air conditioner ECU reduces or stops the output of the air conditioner when it receives a low voltage signal LV2 at H level. Reducing the output of the air conditioner is achieved by reducing the output of a fan of the air conditioner or by reducing (or stopping) the output of a compressor. Meanwhile, the air conditioner ECU recovers the output of the air conditioner to the normal condition or restarts the operation when it receives a low voltage signal LV2 at L level.

Figure 11:
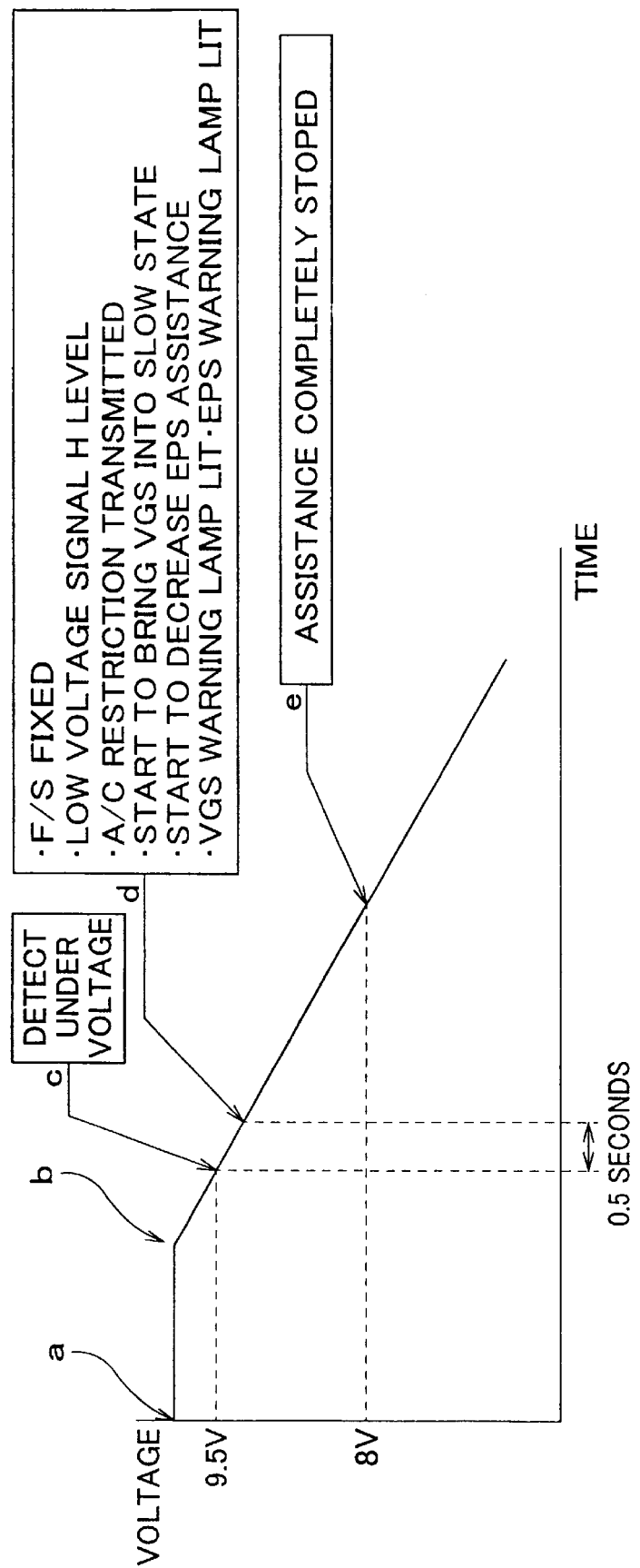
FIG. 11 is a control time chart of a vehicle including the variable gear ratio steering device and the electric power steering apparatus in an under voltage state.
Figure 12:
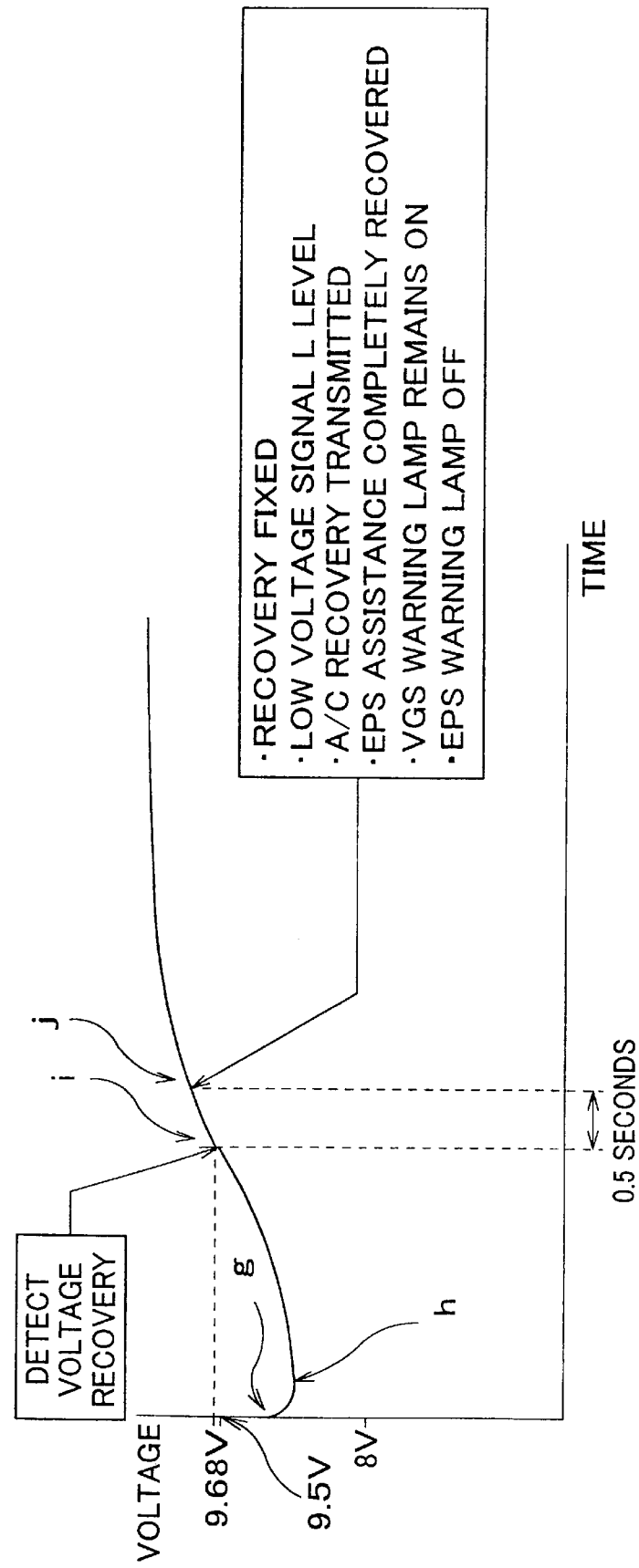
FIG. 12 is a control time chart of the vehicle including the variable gear ratio steering device and the electric power steering apparatus in a voltage recovery state.

With reference to FIGS. 11 and 12, and to FIGS. 1 to 10 if necessary, operation of a vehicle including the aforementioned variable gear ratio steering device and the electric power steering apparatus 1 will be described, in which FIG. 11 is a control time chart when the voltage decreases, and FIG. 12 is a control time chart when the voltage recovers.

[Under Voltage State]

At first, the control time chart shown in FIG. 11 will be described.

As shown in the figure, at the section between Point a and Point b, the power supply BAT supplies a certain constant voltage (IG voltage) over 9.5V. Therefore, the variable gear ratio steering device drives the VGS motor in accordance with the vehicle speed, and changes the eccentricity amount so as to achieve the optimal steering ratio characteristics for the vehicle speed. Meanwhile, the electric power steering apparatus generates a normal assist steering torque associated with the driver's steering torque input so as to ease the driver's steering operation.

At Point b, the voltage starts to decrease. And at the section between Point b and Point c, the voltage decreases. However, since the voltage is still over the certain voltage (9.5V), the low voltage state is not determined by the controller 70 (or the comparison/selection section 71C, 76C). As a result, similar to the section between a and b, the optimal steering ratio characteristics in accordance with the vehicle speed and an assistance associated with the driver's steering torque input can be achieved.

The voltage becomes 9.5V at Point c. However, the low voltage state is not determined-yet. At Point d, the voltage is below 9.5V continuously for more than 0.5 seconds, and fail and safe F/S is fixed. Therefore, the low voltage state is determined by the comparison/selection section 71C of the target eccentricity amount setting means 71, and the comparison/selection section 71C outputs a low voltage signal LV1 at H level. The target eccentricity amount 71a then becomes the maximum value so that the variable gear ratio steering device is smoothly brought into the slow state. At the same time, the VGS warning lamp WL1 is lit. The low voltage state is also determined by the comparison/selection section 76C of the target current value setting means 76, and the comparison/selection section 76C outputs a low voltage signal LV2 at H level. Thereby, the target current value 76Aa outputted from the target current value setting section 76A is multiplied by the correction coefficient C and the target current value 76a is decreasingly corrected. As a result, assistance of the assist steering torque is decreased. Additionally, the air conditioner is stopped (A/C restricted) because the low voltage signal LV2 at H level is also sent to the air conditioner ECU. By these operations, a life extension or recovery of the power supply BAT is performed.

At the section between Point d and Point e, because the voltage of the power supply BAT is less than 9.5V but is more than 8V, the variable gear ratio steering device has been brought into the slow state. The VGS motor 27 does not consume electric power after turning to the slow state, and hence a life extension or recovery of the power supply BAT is performed. Further, when the voltage decreases in the range of between 9.5V and 8V, the electric power steering apparatus generates an assist steering torque associated with the voltage, with the use of the correction coefficient C which decreases in accordance with the voltage, and with such an assist steering torque, the driver's steering operation is assisted. At the section between d and e, because the assist steering torque is decreasing smoothly in accordance the voltage, the driver does not experience any uncomfortable feel even if the voltage of the power supply BAT decreases during the steering operation. Further, because the assist steering torque is changed in accordance with the voltage, the power supply BAT is not subject to a heavy load. Decrement of the voltage of the power supply BAT from 9.5V to 8V takes at least 10 seconds, and usually more. The VGS warning lamp WL1 and the EPS warning lamp WL2 remain on, and the air conditioner remains stopped. This can attract the driver's attention as well as perform a life extension or recovery of the power supply.

At Point e, the voltage of the power supply BAT becomes 8V, viz. the lower limit voltage K2, and as shown in FIG. 10B, the correction coefficient C becomes 0 (zero). The electric power steering apparatus then stops to generate an assist steering torque, i.e., assistance is wholly stopped, so that an improved life extension or recovery of the power supply BAT is performed. It should be noted that even if the assistance is wholly stopped, the variable gear ratio steering device is in the slow state, enabling the steering operation by the driver's manual steering torque input. If the variable gear ratio steering device has not been brought into the slow state at Point e, the VGS motor 27 is continuously driven so as to bring into the slow state. This is for making the variable gear ratio steering device stop merely in the slow state.

As mentioned above, an abrupt voltage drop can be prevented because of the life extension or recovery performance of the power supply BAT during the under voltage state. Further, the driver does not experience any uncomfortable feel because the electric power steering apparatus decreasingly corrects the assist steering torque in accordance with the voltage. Moreover, the driver's steering operation is not disturbed because the variable gear ratio steering device is brought into the slow state.

[Voltage Recovery State]

Next, the control time chart shown in FIG. 12 will be described, in which the voltage recovers.

As shown in the figure, at Point g, the voltage (IG voltage) of the power supply BAT is less than 9.5V but is more than 8V. Therefore, the variable gear ratio steering device has been stopped in the slow state. And as mentioned above, the assist steering torque of the electric power steering apparatus is corresponding to the voltage of the power supply BAT. The VGS warning lamp WL1 and the EPS warning lamp WL2 remain on, and the air conditioner remains stopped. In other words, a life extension or recovery of the power supply BAT is being performed.

As a result of the life extension performance, decrement of the voltage stops at Point h, and at the same time, recovery or increment of the voltage starts. At the section between Point h and Point i, because the voltage is less than 9.68V that is the recovery voltage K0, the life extension remains performed. However, the assist steering torque generated by the electric power steering apparatus increases in accordance with the increased voltage.

At Point i, the voltage reaches to the recovery voltage K0, viz. 9.68V. However, the normal state is not determined at Point i. At Point j, the voltage is over 9.68V continuously for more than 0.5 seconds (viz. recovery fixed). Then, the normal state is determined by the comparison/selection section 76C of the target current value setting means 76, and the comparison/selection section 76C outputs a low voltage signal LV2 at L level. Therefore, the electric power steering apparatus generates a normal assist steering torque, and the EPS warning lamp WL2 is off, and further the air conditioner is restarted. The driver is assisted by the normal assist steering torque, and the vehicle is air-conditioned (A/C recovered). The assist steering torque substantially recovers to the normal value (referring to correction coefficient C of FIG. 10) after the voltage is over 9.5V that is the certain voltage K1.

Meanwhile, the variable gear ratio steering device remains in the slow state even if the voltage of the power supply BAT is over 9.68V continuously for 0.5 seconds. The VGS warning lamp WL1 remains on. The variable gear ratio steering device is operated in a usual manner with the VGS warning lamp Wl1 turned off, such as when the voltage of the power supply BAT is over 9.5V after turning off and then on the ignition switch. In this occasion, the comparison/selection section 71C of the target eccentricity amount setting means 71 outputs a normal low voltage signal LV1 at L level.

As mentioned above, because the assist steering torque of the electric power steering apparatus is increased when the voltage recovers, the driver does not experience any uncomfortable feel. Further, the variable gear ratio steering device is kept in the slow state even if the voltage of the power supply BAT recovers, so as to prepare for an unstable state after the recovery. This is for making the variable gear ratio steering device stop merely in the slow state even if the voltage decreases again. Moreover, the recovery of the voltage is promoted.

While the invention has been described in detail and with reference to specific embodiments thereof, it will be apparent to one skilled in the art that various changes and modifications can be made therein without departing from the spirit and scope thereof. For example, the assist steering torque of the electric power steering apparatus may be decreasingly corrected by way of fade-out control means of the electric power steering apparatus disclosed in the applicant's Japanese patent application No. Hei 10-377614 (unpublished). Further, decreasing correction of the assist steering torque is not always necessary. Means for bringing the variable gear ratio steering device into the slow state is not limited to the specific embodiments mentioned above. It is also possible to compulsively stop the supply to the power supply of the electric power steering apparatus when the voltage decreases to the lower limit voltage or less.

What is claimed is:

1. A vehicle including a variable gear ratio steering device and an electric power steering apparatus, the variable gear ratio steering device influencing on a steering system of the vehicle and varying a ratio of a steering angle of steerable road wheels to a steering wheel angle by driving an electric motor in accordance with a vehicle speed, and the electric power steering apparatus influencing on the steering system of the vehicle and providing an assist steering wheel torque by driving an electric motor in accordance with a manual steering wheel torque, the vehicle comprising:

a power supply voltage detector for detecting a voltage of a power supply; and a control unit for controlling the electric motor of said variable gear ratio steering device in accordance with the detected voltage, wherein, when the detected voltage decreases to a certain voltage or lower, the control unit brings the variable gear ratio steering device into a slow state and thereafter stops the variable gear ratio steering device.

2. A vehicle according to claim 1, wherein said control unit reduces assistance of the assist steering wheel torque from the electric motor of said electric power steering apparatus when the detected voltage decreases to the certain voltage or lower, and said control unit stops the assistance of said assist steering wheel torque when the voltage further decreases to a lower limit voltage which is set to be lower than the certain voltage.

3. A vehicle according to claim 2, wherein said control unit carries out assistance by decreasing said assist steering wheel torque in accordance with a value of the detected voltage when the detected voltage is between the certain voltage and the lower limit voltage.

4. A vehicle according to claim 1, wherein said control unit brings the variable gear ratio steering device into the slow state when the detected voltage decreases to the certain voltage or lower continuously for a certain period of time.

5. A vehicle according to claim 2, wherein said control unit brings the variable gear ratio steering device into the slow state and at the same time decreases assistance of the assist steering wheel torque from the electric power steering apparatus when the detected voltage decreases to the certain voltage or lower continuously for a certain period of time.

6. A vehicle according to claim 4, wherein said control unit cooperatively controls said variable gear ratio steering device with other equipment, such as an air conditioning system and a car audio system.

7. A vehicle according to claim 5, wherein said control unit cooperatively controls said variable gear ratio steering device and said electric power steering apparatus with other equipment, such as an air conditioning system and a car audio system.

* * * * *